(12) United States Patent
Kona

(10) Patent No.: US 11,515,624 B2
(45) Date of Patent: Nov. 29, 2022

(54) INTEGRATED CAVITY BACKED SLOT ARRAY ANTENNA SYSTEM

(71) Applicant: GM GLOBAL TECHNOLOGY OPERATIONS LLC, Detroit, MI (US)

(72) Inventor: Keerti S. Kona, Woodland Hills, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 903 days.

(21) Appl. No.: 16/369,132

(22) Filed: Mar. 29, 2019

(65) Prior Publication Data
US 2020/0313288 A1 Oct. 1, 2020

(51) Int. Cl.
*H01Q 1/32* (2006.01)
*G01S 7/03* (2006.01)
*G01S 13/931* (2020.01)
*H01Q 13/20* (2006.01)

(52) U.S. Cl.
CPC ............. *H01Q 1/3233* (2013.01); *G01S 7/03* (2013.01); *G01S 13/931* (2013.01); *H01Q 13/20* (2013.01)

(58) Field of Classification Search
CPC .... H01Q 1/3233; H01Q 13/20; H01Q 21/005; H01Q 13/106; H01Q 1/32; H01Q 1/36; H01Q 1/38; H01Q 1/48; H01Q 1/50; H01Q 21/061; H01Q 21/08; G01S 7/03; G01S 13/931; G01S 2013/93271
See application file for complete search history.

(56) References Cited

U.S. PATENT DOCUMENTS

| 5,898,405 | A  | * | 4/1999  | Iwasaki ............... H01Q 9/0457 343/846 |
| 6,933,881 | B2 |   | 8/2005  | Shinoda et al. |
| 7,880,614 | B2 |   | 2/2011  | Forster et al. |
| 8,704,719 | B2 |   | 4/2014  | Song et al. |
| 8,976,072 | B2 | * | 3/2015  | Lenormand ............ H01Q 3/04 343/762 |
| 9,869,762 | B1 | * | 1/2018  | Alland .................. H01Q 21/08 |
| 10,109,910 | B2 | * | 10/2018 | Shi ....................... H01Q 1/3283 |
| 10,145,954 | B2 | * | 12/2018 | Davis ..................... G01S 7/0233 |
| 11,221,395 | B2 | * | 1/2022  | Mokhtari ............. G01S 13/931 |
| 11,353,552 | B2 | * | 6/2022  | Achour .................. G01S 7/411 |

(Continued)

FOREIGN PATENT DOCUMENTS

CN 109088163 A 12/2018

OTHER PUBLICATIONS

Johnson J. H. Wang, "Traveling-wave antenna array (TWAA) with multioctave scan-gain-bandwidth", Phased Array Systems and Technology (PAST) 2016 IEEE International Symposium on, pp. 1-8, 2016.

(Continued)

*Primary Examiner* — Vibol Tan
(74) *Attorney, Agent, or Firm* — Lorenz & Kopf, LLP

(57) ABSTRACT

An antenna system includes a substrate of a dielectric material. A conductive layer defines a feed slot joins a number of side slots arranged in a line forming an array. The side slots are spaced from one another and the conductive layer is disposed on the substrate. The array is configured to radiate a radiation pattern characterized by a first beam width in a first plane and a second beam width in a second plane perpendicular to the first plane, wherein the first beam width is wider than the second beam width.

20 Claims, 5 Drawing Sheets

(56) References Cited

U.S. PATENT DOCUMENTS

| 2014/0019813 | A1 | 1/2014 | McLean et al. | |
|---|---|---|---|---|
| 2015/0002329 | A1* | 1/2015 | Murad | G01S 7/4004 342/155 |
| 2019/0190156 | A1* | 6/2019 | Kim | H01Q 1/32 |
| 2019/0379132 | A1* | 12/2019 | Pelletti | H01Q 1/36 |

OTHER PUBLICATIONS

M. Grabowski, "Non-resonant slotted waveguide antenna design method", High Frequency Electronics, Feb. 2012.
S. M. Bowers, A. Safaripour, A. Hajimiri, "An integrated traveling-wave slot radiator", IEEE Radio Freq. Integr. Circuits Symp. Dig., pp. 369-372, Jun. 2014.
Rajput, Y .; Rawat, T.S.; Varshney, L.: CPW fed patch antenna for GPS applications. Int. J. Comput. Eng. Res., 2 (6) (2012), 5-8.
Z. Chen and S.Otto, "A Taper Optimization for Pattern Synthesis of Microstrip Series-Fed Patch Array Antennas," Proceedings of the 2 European Wireless Technology Conference, 2009.
Shaowen Hu, Yiqiang Wu, Ye Zhang, Huilin Zhou, "Design of a CPW-Fed Ultra Wide Band Antenna", Open Journal of Antennas and Propagation, vol. 1, pp. 18-22, 2013.
R. Paryani, "Design of a wideband dual-polarized cavity backed slot antenna," University of Central Florida, Tech. Rep., 2010.
J. F. Huang, C. W. Kuo, "CPW-fed bowtie slot antenna", Microw. Opt. Technol. Lett., vol. 19, No. 5, pp. 358-360, Dec. 1998.
W. Li, K. D. Xu, X. Tang, Y. Yang, Y. Liu, Q. H. Liu, "Substrate integrated waveguide cavity-backed slot array antenna using high-order radiation modes for dual-band applications in K-band", IEEE Trans. Antennas Propag., vol. 65, No. 9, pp. 4556-4565, Sep. 2017.
Holland, S.S.: Minituarization of microstrip patch antennas for GPS application, May 2008.
Chethan Kumar Y.B Abdulraheem Killedar. "mmWave Radar—ADAS Application: Embedded Processing—Radar, Analytics & Processors", 2016.
I. Nystrom, D. Karlsson, "Reduction of back radiation and cross-coupling in dual polarized aperture coupled patch antennas", 1997 IEEE Antennas Propagat. Soc. Int. Symp. Dig., pp. 2222-2225.
http://www.statschippac.com/~/media/Files/DocLibrary/brochures/STATS_ChipPAC_SiP.ashx. "System-in-Packge (SiP) Solutions". JCET. STATS_ChipPAC_Pte.Ltd. 2018.

\* cited by examiner

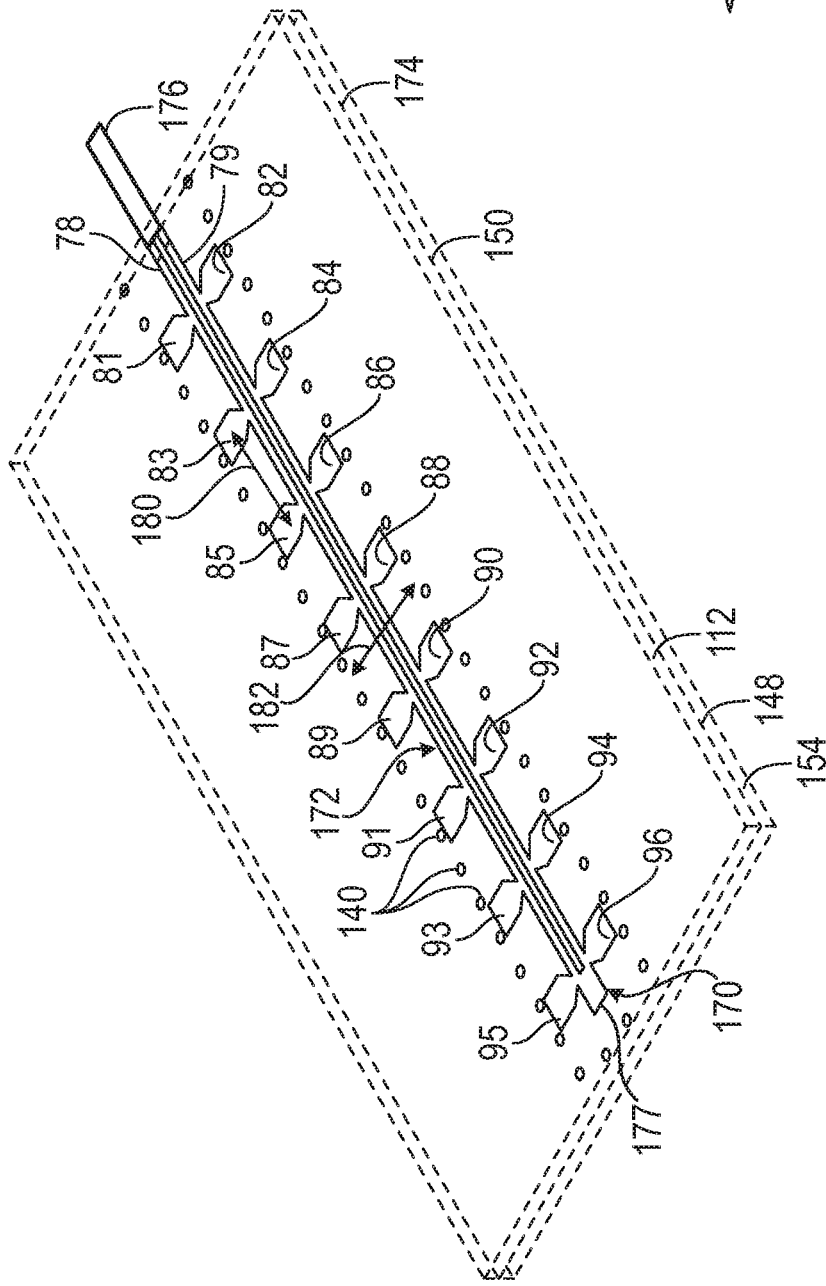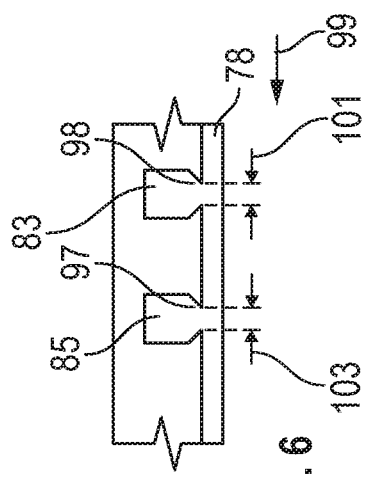

INTEGRATED CAVITY BACKED SLOT ARRAY ANTENNA SYSTEM

INTRODUCTION

The technical field generally relates to antennas, and more particularly relates to slot array antenna systems that support precise location determinations for applications such as radar imaging.

In general, range, velocity, azimuth angle and other target attributions are measured by radar devices. In some applications, such as radar systems for automobiles, it may be desirable to provide information representing or relating to the characteristics of a target or object detected by the radar system. This information may be used to evaluate the detected target or object. Typical automotive imaging radar sensors operate at conventional frequencies of 76-81 GHz. In applications such as object detection and classification, fast and precise capabilities are desirable for immediate determinations regarding approaching objects. The azimuth and the elevation of an object are typical parameters of interest. Receiving object information requires an antenna that supports the determination requirements.

Slot antennas are antennas used in high frequency range applications. Slot antennas are typically fed by a waveguide that is used as the transmission line to feed the slots. In slot antennas subjected to a waveguide, the slot creates a barrier to current flow, which acts as an excitation system resulting in the propagation and radiation of energy waves, where the slot acts as resonant radiator. The power that the slot radiates depends on the physical characteristics of the slot. Slot antennas are complicated to manufacture and have relatively high fabrication and assembly costs. For example, slot antennas typically use vias. A via (vertical interconnect access) is an electrical connection between layers in an electronic circuit that pass through one or more adjacent layers. When these layers are digital circuit boards operating with radio frequency or microwave signals they have high noise sensitivity and tight impedance tolerances than traditional digital circuit boards. The use of vias penetrating such boards makes achieving those requirements challenging.

Accordingly, it is desirable to provide slot antennas that provide desirable performance characteristics. In addition, it is desirable to provide slot antennas that have lower fabrication and assembly costs. Furthermore, other desirable features and characteristics of the present invention will become apparent from the subsequent detailed description and the appended claims, taken in conjunction with the accompanying drawings and the foregoing technical field and background.

SUMMARY

In a number of embodiments, an antenna system includes a substrate of a dielectric material. A conductive layer is disposed on the substrate and defines a feed slot joining a number of side slots arranged in a line forming an array, the side slots spaced from one another. The array is configured to radiate a radiation pattern characterized by a first beam width in a first plane and a second beam width in a second plane perpendicular to the first plane, wherein the first beam width is wider than the second beam width.

In additional embodiments, the conductive layer has first and second sides. A first ground plane is disposed on the first side of the array and is spaced apart from the array. A number of conducting pillars ground the substrate to the first ground plane. The conducting pillars define a second ground plane on the substrate. The conducting pillars do not extend through the substrate.

In additional embodiments, the substrate is disposed on the second side of the array.

In additional embodiments, the first ground plane, the conductive pillars and the second ground plane define an air cavity configured to prevent back radiation in a direction outward from the first side of the substrate.

In additional embodiments, the substrate is configured as an interposer through which the array is fed a signal, wherein the array is configured to radiate the radiation pattern through the interposer.

In additional embodiments, a dielectric layer is disposed on the conductive layer.

In additional embodiments, a coplanar waveguide is configured to launch a signal to the feed slot.

In additional embodiments, a ground plane is spaced apart from the array. A front end module is configured to generate a signal and to deliver the signal to the coplanar waveguide. The front end module is disposed between the conductive layer and the ground plane.

In additional embodiments, the ground plane is disposed on a radio frequency printed circuit board.

In additional embodiments, a transceiver module disposed on the radio frequency printed circuit board and coupled with the array through the front end module and the substrate.

In a number of additional embodiments, an antenna system includes a substrate of a dielectric material. A conductive layer is disposed on the substrate and defines a feed slot joining a number of side slots arranged in a line forming an array. The side slots are spaced from one another. The conductive layer defines an opening between each of the side slots and the feed slot. The respective opening between at least one of the side slots and the feed slot is smaller than the respective opening between another of the side slots and the feed slot. The array is configured to radiate a radiation pattern characterized by a first beam width in a first plane and a second beam width in a second plane perpendicular to the first plane, wherein the first beam width is wider than the second beam width.

In additional embodiments, the conductive layer has first and second sides. A first ground plane is disposed on the first side of the conductive layer and is spaced apart from the conductive layer. A number of conducting pillars ground the substrate to the first ground plane. The substrate is disposed on the second side of the conductive layer. The conducting pillars define a second ground plane on the substrate and do not extend through the substrate.

In additional embodiments, a coplanar waveguide is configured to launch a signal to the feed slot. A front end module is configured to generate a signal and to deliver the signal to the coplanar waveguide. The front end module is disposed between the conductive layer and the ground plane.

In additional embodiments, the second ground plane comprises a silicon material, is defined on the substrate, and is bounded by the conductive pillars. The first ground plane, the conductive pillars and the second ground plane define an air cavity configured to prevent back radiation in a direction outward from the first side of the substrate.

In additional embodiments, a second feed slot is connected with an additional number of side slots.

In additional embodiments, the substrate is configured as an interposer through which the array is fed a signal. The array is configured to radiate the radiation pattern through the interposer.

In additional embodiments, a dielectric layer is disposed on the conductive layer.

In additional embodiments, a transmitter is coupled with the array. The array is coupled with the transmitter through a radio frequency printed circuit board. A ground plane is disposed on the radio frequency printed circuit board and is spaced away from the substrate.

In additional embodiments, a number of conductive pillars surround the array and contact the substrate.

In a number of additional embodiments, an antenna system for a radar of a vehicle includes a substrate of a dielectric material. A conductive layer defines a feed slot joining a number of side slots arranged in a line forming an array through the conductive layer. The side slots are spaced from one another and the array is disposed on the substrate. The conductive layer has first and second sides. A coplanar waveguide is configured to launch a signal to the feed slot. A first ground plane is disposed on the first side of the conductive layer and is spaced apart from the conductive layer. A number of conducting pillars ground the substrate to the first ground plane. A second ground plane of a silicon material is defined on the substrate and is bounded by the conductive pillars. Electromagnetic energy is radiated by the array as a result of travelling waves that travel along the feed slot. The array is configured to radiate a radiation pattern characterized by a first beam width in a first plane and a second beam width in a second plane perpendicular to the first plane, wherein the first beam width is wider than the second beam width. The first beam width extends in an azimuth direction relative to the vehicle and the second beam width extends in an elevation direction relative to the vehicle.

BRIEF DESCRIPTION OF THE DRAWINGS

The exemplary embodiments will hereinafter be described in conjunction with the following drawing figures, wherein like numerals denote like elements, and wherein:

FIG. 5 is a schematic illustration of an antenna array assembly of the antenna system of FIG. 4, in accordance with an embodiment;

FIG. 6 is a schematic, detail illustration of part of the antenna array of FIG. 5, in accordance with an embodiment;

DETAILED DESCRIPTION

Figure 1:
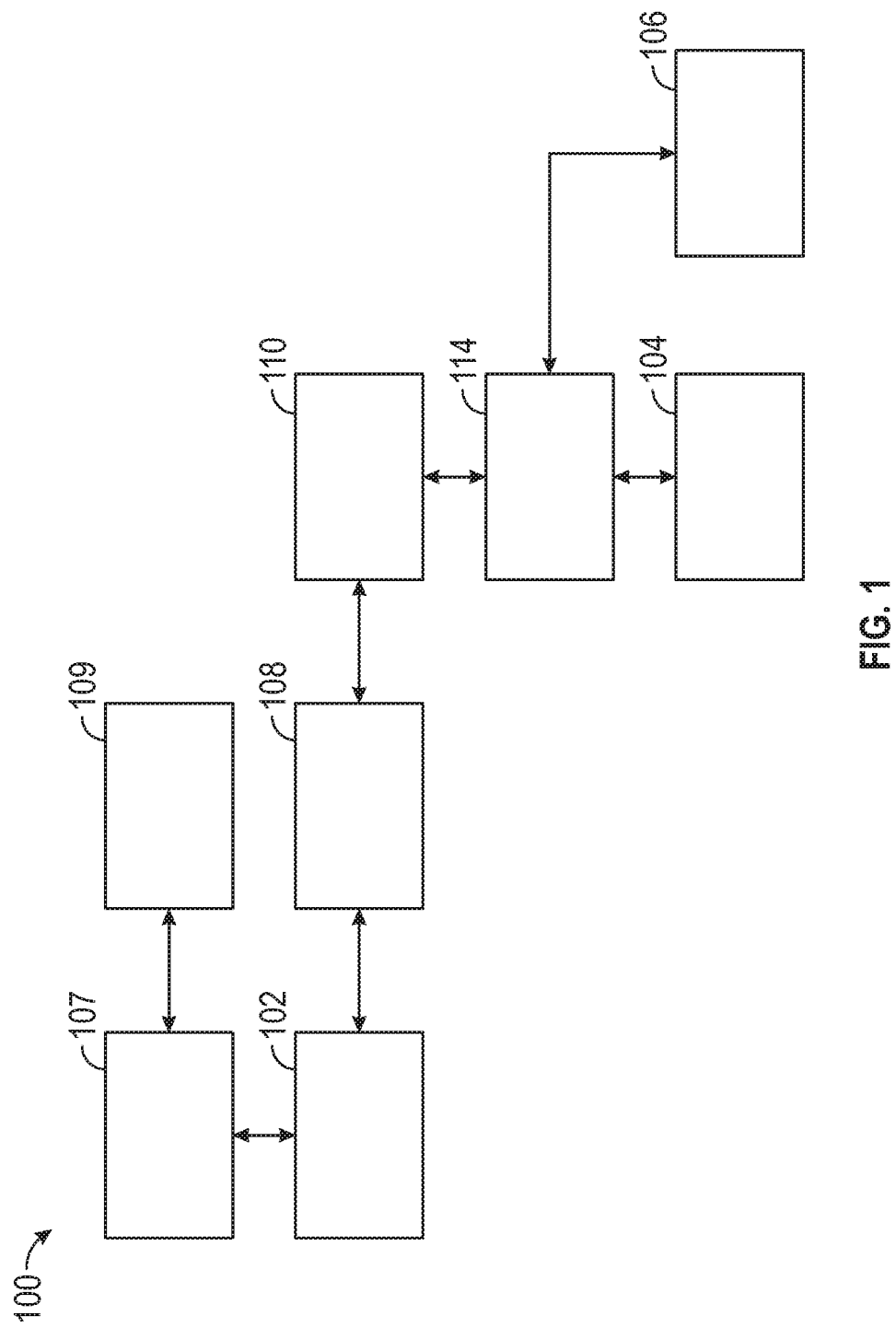
FIG. 1 is a functional block diagram of an antenna system, in accordance with an embodiment.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

This description discloses configurations and implementations of antenna systems for operating at high frequencies, such as 235 GHz, a sub-terahertz frequency range for uses such as radar imaging. Embodiments of antenna architectures and components disclosed herein in general, may use a thin interposer substrate of a dielectric material such as silicon, and support configurations with no vias through the interposer. In other embodiments other dielectric materials may be used for the interposer. In a number of embodiments, an antenna array radiates electromagnetic energy for the radiation pattern through the interposer substrate. The disclosed architectures have the advantages of low fabrication complexity and low assembly costs. The antenna radiating structure generally includes a slotted, traveling wave array. The ground for the antenna may be formed by a combination of conductive pillars that extend from the interposer to a ground plane located on an radio frequency board that may contain additional integrated circuits and electronic components. A waveguide or feed line connects directly to the array to transmit and receive inputs/outputs from radio frequency integrated circuits. A coplanar waveguide to slotted array transition is used to excite the antenna array, which radiates directly through the interposer substrate. The design of a single radiating array advantageously produces a narrow beam width in elevation and a broad beam width in azimuth. A narrow beam width in elevation may correspond with a fifteen-sixteen degree range of view for example, that is of concern for a vehicle application. A broad beam in azimuth corresponds to a broad range of view for the horizontal surroundings of a vehicle application. In other applications, the antenna may be tailored to different beam widths corresponding to the scope of view of interest.

In a number of embodiments, the antenna system provides very good impedance match over a 12 GHz bandwidth and desirable radiation patterns in a simple low cost architecture. Low cost is achieved by using one back metal layer and avoiding a need for vias through the interposer. The architecture may use a Si (1 KΩ-10 KΩ cm) interposer or may be implemented using other interposers such as glass or organic substrates. In some embodiments vias through an interposer such as through-silicon vias or through-glass vias may be used, where added fabrication complexity and cost is acceptable.

Figure 2:
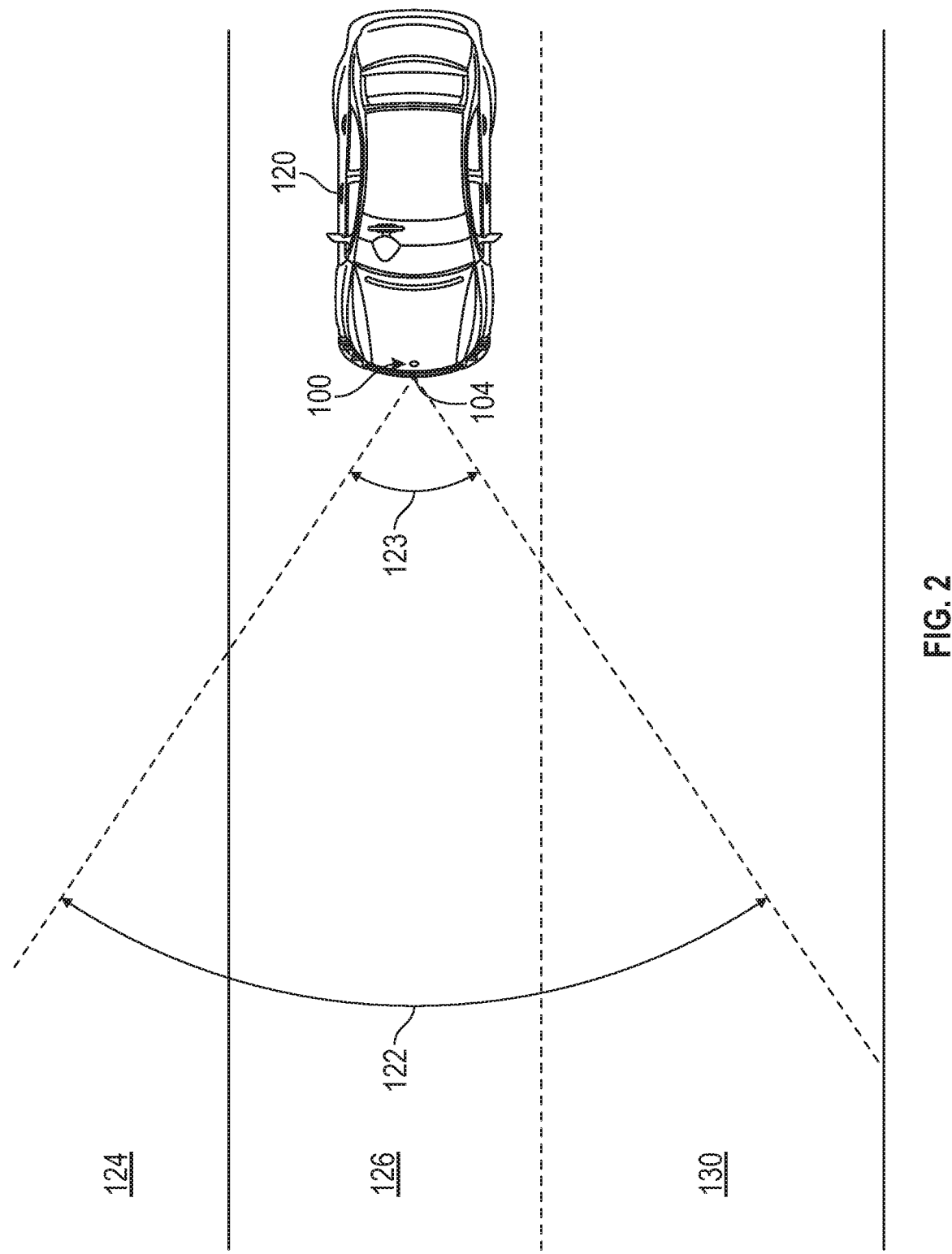
FIG. 2 is a schematic illustration of the azimuth coverage of an antenna system in a vehicle, in accordance with an embodiment.

Referring to FIG. 1, a functional block diagram of an antenna system 100 includes a transceiver module 102 and transmitting/receiving antennas 104, 106 respectively, according to one embodiment. The antennas 104, 106 are configured to radiate and intercept electromagnetic energy according to characteristics further described below. In transmission, the antenna 104 radiates a radio frequency signal and an associated receiver antenna 106 detects any reflections from potential targets. A processing module 107 interfaces with the transceiver module 102. In some embodiments, the processor and transceiver functions are on the same chip. In the current embodiment, the processing module 107 includes a processor that sends control signals to the transceiver module 102, processes the received signals to identify targets and their attributes, and may serve as an interface with other controllers such as electronic control unit 109. For example, the central processing module 107 may receive data on reflections, compare them to the transmitted signal and determine range, angle and velocity of the target. In some embodiments the processing module 107 interfaces with the electronic control unit 109, which may support other systems and functions. For example, the electronic control unit 109 may provide central processing functions of a vehicle (such as shown in FIG. 2) associated with the antenna system 100. In the current embodiment, the transceiver module 102 is a self-contained frequency modulated continuous wave transceiver single-chip solution for a band of 76 to 81 GHz. As a continuous wave transmitter, the transceiver module 102 supports relatively low measurement times and high resolution. Other embodiments may employ separate transmitter and receiver devices.

In the current embodiment, the transceiver module 102 is coupled with the antennas 104, 106 through a radio frequency printed circuit board (RF PCB) 108 and an interposer assembly 110 including an interposer substrate 112 and a higher frequency front-end (FE) module 114 with suitable transmission line connections. The FE module 114 contains the circuitry including power amplifiers, switches, resonators, drivers, etc. for the antenna 104. The FE module 114 may convey communication data to and from the transceiver module 102, which in turn, is conveyed to and from antennas 104, 106. In the current embodiment the FE module 114 is contained on a single chip. The interposer assembly 110 is advantageous when the operating frequency exceeds W-band (110 GHz) because the tolerances required to achieve the desired radar sensor performance become tighter than what is readily achievable directly using conventional RF printed circuit boards. An interposer material, such as silicon, is used for properties such as smoothness and hardness that allow circuitry with small features (e.g., <10 um) to be realized with tight tolerances (e.g., <2 um).

The antenna system 100 enables 78 GHz transmit signals from the transceiver module 102 to connect with the antenna 104 through the FE module 114, which triples the signals, such as to 234 GHz and conveys them out the antennas. The receiving antenna 106 collects incoming 234 GHz signals, which are down-converted to 78 GHz by the FE module 114 and sent to the transceiver module 102 and the processing module 107 for processing. This structure delivers desirable RF performance at 234 GHz when coupled with antennas having a geometry described below. It should be understood that the operating frequencies of the antenna system may be over a bandwidth such as 12 GHz.

Figure 3:
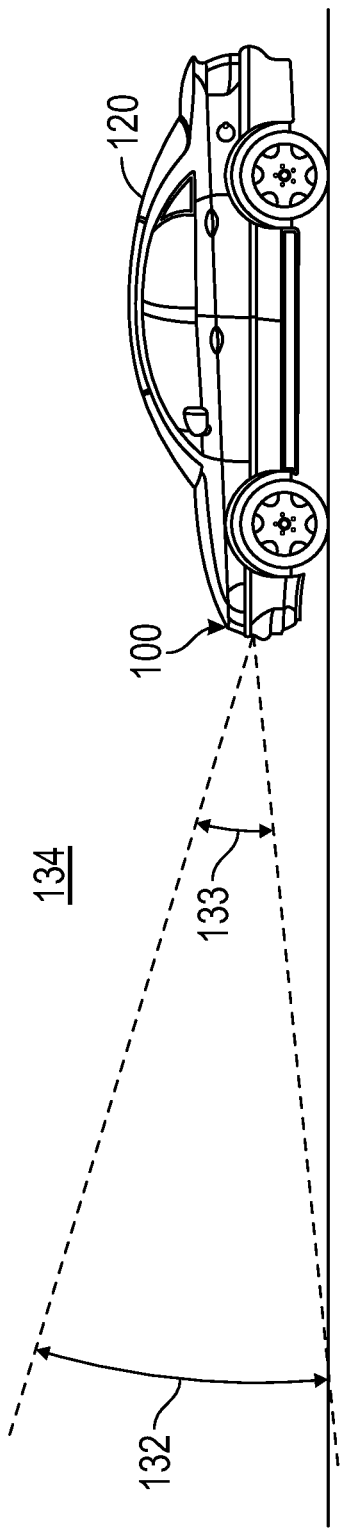
FIG. 3 is schematic illustration of the elevation coverage of an antenna system in a vehicle, in accordance with an embodiment.

Referring to FIGS. 2 and 3, the system 100 may be applied to a vehicle 120 to cover a particular area, in this example to cover the area in front of a vehicle 120. It should be understood that additional antennas and/or antenna systems may be included, such as to provide radars with different ranges such as long range and mid-range. Additional radars may be used to detect targets in multiple directions such as at the sides of the vehicle 120 and/or at the rear of the vehicle 120. The radar physical radiation may be three-dimensional but for purposes of the present disclosure is represented by both horizontal (azimuth) and vertical (elevation) radiation patterns.

The radiation pattern of the antenna 104 depends on its structure as further described below and its mounting, in this example on the vehicle 120. FIG. 2 depicts the beam width 122 of the radar in the azimuth plane 124, assuming the radar is at the front bumper of the vehicle 120. In some embodiments, the beam width may be tailored to cover a single road lane 126 and as such would have a field of view with an angle 123 of approximately ±15-degrees, or 30-degrees total. For a wider field of view, such as to cover two road lanes 126, 130, the field of view in the current embodiment is wider to cover the area of search, for example, 60-degrees. A wider beam width is desirable for additional coverage to capture targets moving in front and laterally relative to the vehicle 120 and as described below, the disclosed antenna system delivers a 85-degree field of view. In other embodiments, the field of view is selected for the application. FIG. 3 depicts the beam width 132 of the radar in the vertical plane 134. In the vertical plane 134 the coverage may be narrower, for example ±5-degrees or 10-degrees total. In the current embodiment, and as further described below, the beam width in the vertical plane 134 provided by the antenna system 100 is at an angle 133 of 16.5-degrees.

Figure 4:
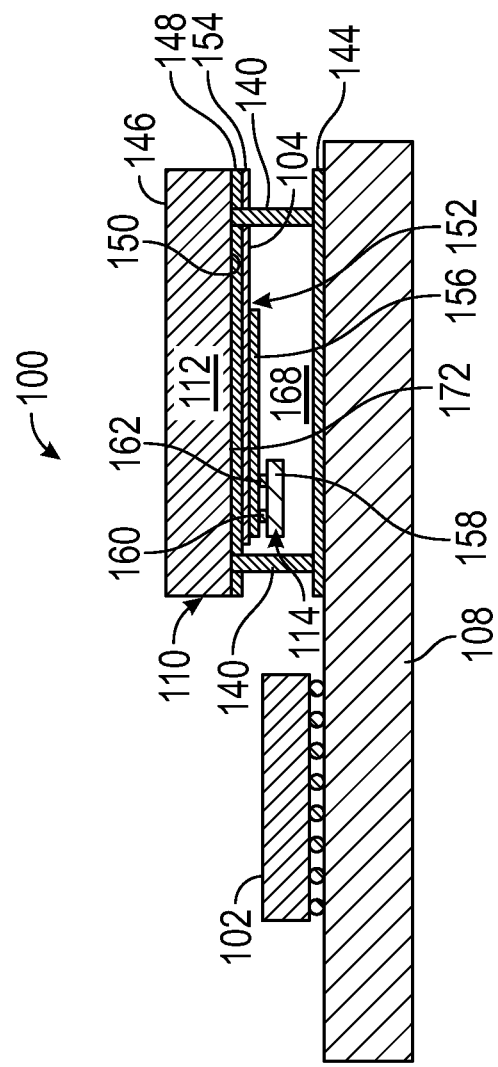
FIG. 4 is a schematic illustration of an antenna system, in accordance with an embodiment.

Referring to FIG. 4, the architecture of the antenna system 100 is shown schematically in cross section. The antenna system 100 includes an integrated assembly that connects with radar integrated circuits including the transceiver module 102, which is located on the RF PCB 108. In some embodiments, the processing module 107 is also located on the RF PCB 108. The interposer assembly 110 is mounted on the RF PCB 108 by conducting columns, in this embodiment copper pillars 140, which extend from the interposer substrate 112 but not through it. In this embodiment, the interposer substrate 112 is made of a dielectric, specifically silicon, and is approximately 50 um thick. The RF PCB 108 has a metal layer printed or otherwise deposited or applied to its top surface 142 and which serves as a ground plane 144. The copper pillars 140 support and ground the interposer substrate 112 at an elevated position on the ground plane 144 of the RF PCB 108. The copper pillars 140 are approximately 75 um in height with a 200 um pitch. The top surface 146 of the interposer substrate 112 is clear of any additional layers above the silicon and in this embodiment is free from electronic elements that would otherwise require coupling through the interposer substrate 112 using vias. The number of types of vias determines the PCB process complexity. Having a higher number of types of vias typically causes higher processing steps, such as those that use sequential lamination and can cause via registration error, which increases the PCB cost and lower yield. Accordingly, a benefit of the current architecture is simplified manufacturing due to the absence of through interposer vias. For example, an antenna layer 148 is defined by a conductive material and is disposed on the bottom surface 150 of the interposer substrate 112 and avoids the need for vias through the interposer substrate 112 that would otherwise be needed to couple with electronics and antenna on top of the interposer substrate 112.

Underneath the interposer substrate 112, a redistribution layer 152 includes a dielectric layer 154 applied over the antenna layer 148. In this embodiment, the dielectric layer 154 is made of benzocyclobutene (BCB) and is 10 um thick. In other embodiments, a different dielectric layer material may be used on the bottom of the interposer substrate 112. The redistribution layer 152 includes a metal layer 156, in this embodiment copper, printed or otherwise applied over the dielectric layer 154. The redistribution layer 152 provides the transition from the FE module 114 to the conductive feed for antenna 104. In the current embodiment, the FE module 114 is embodied as a monolithic microwave integrated circuit (MMIC) chip 158. The MMIC chip 158 hangs from the redistribution layer 152 and specifically from the metal layer 156 by transitions 160,162. A low loss feed launch from the MMIC chip 158 to the antenna 104 is provided through the transitions 160, 162 for efficient excitation. The architecture of the antenna system 100 shows that the feed connects through the FE module 114, which is located on the bottom side of the interposer substrate 112. The antenna feed may be located on the top side of the interposer substrate 112, but that requires vias through the interposer substrate 112. The illustrated embodiment is advantageous from a cost and fabrication complexity standpoint to avoid the use of through-interposer vias.

In the current embodiment, the antenna layer 148 resonates through the interposer substrate 112. It has been found that the dielectric of the interposer substrate 112 improves efficiency of the antenna layer 148 as a result of the embodiment's architecture. An air cavity 168 is formed as an air substrate between the antenna layer 148 and the ground plane 144 and is bounded by the copper pillars 140 for improved radiation. The ground plane 144 reflects the radio frequency waves from the antenna layer 148 aiding in transmission. Shielding to prevent back-radiation is accomplished through the copper pillars 140 and attaching them to the ground plane 144 below the metal of the antenna layer 148.

Components of the antenna system 100 are illustrated in greater detail in FIG. 5, in particular showing details of the antenna layer 148. In this view the substrate 112 is shown transparent for visibility of the antenna layer 148. The antenna array 170 is a cavity backed slot type array and is located on the bottom side, specifically at the bottom surface 150 of the dielectric interposer substrate 112. The antenna array 170 includes a conductive layer 174, in this embodiment of a copper material, disposed on the entire or substantially the entire, surface 150 of the substrate 112, as described in more detail below.

The copper pillars 140 extend through the conductive layer 174 to the substrate 112 and in the opposite direction to the PCB ground plane 144 as shown in FIG. 4. The area of the substrate 112 inside the boundary of the pillars 140 serves as a second ground plane 172 on the top of the cavity 168 that is silicon. Specifically, the cavity 168 is disposed around the antenna aperture and is bounded by the groundplanes 144, 172 and the copper pillars 140. The copper pillars 140 encircle the antenna array 170 and are approximately 75 um in height and positioned on a 200 um pitch which reduces wave leakage. The redistribution layer 152 including the BCB dielectric layer 154 on the interposer substrate 112 bottom provides a transition from the MMIC chip 158 to the antenna feed. Launch from the MIMIC chip 158 to the antenna array 170 through the redistribution layer 152 provides a transition with desirable excitation for the array 170. A transition with a coplanar waveguide (CPW) 176 launch from the MIMIC chip 158 to the antenna array 170 for effective excitation of the antenna array 170 is configured for the traveling wave feed and is configured to propagate the feed completely through the array. The CPW 176 is fed from the MIMIC chip 158 through a ground-signal-ground feed at the CPW 176.

The antenna array 170 is configured for broad bandwidth and low losses as a travelling wave array. Two feed slots 78, 79 are formed completely through the thickness of the conductive layer 174 and extend for a length from the CPW 176 to an opposite end 177 and join together at the end 177. The feed slots 78, 79 are parallel with one another. The feed slots 78, 79 join with several side slots 81-96, arranged in pairs along the array 170. In other embodiments a different number of side slots 81-96 may be used to achieve the desired coverage and resolution. For example, adding additional side slot pairs along the length of the antenna array 170 may increase resolution. The radiating elements are the side slots 81-96, which are each coupled directly to one of the feed slots 78, 79 to receive the propagating waves. The side slots 81-96 radiate individually and due to their arrayed configuration, the radiation of all the elements sum to form the antenna array's radiation beam, which has high gain and high directivity, with minimum losses. Antenna performance is a function of the structure of the antenna array 170. In the current embodiment, the side slots 81-96 are dissimilar as detailed below, with approximately half-lambda spacings 180 and lengths 182 across each aligned pair of side slots (e.g. 85, 86). The number of side slots 81-96 may be tailored to provide the desired bandwidth and for radiation efficiency and resolution.

The antenna array 170 is a travelling wave array with, in this embodiment, eight pairs of side slots 81-96 fed by the feed slots 78, 79. This produces a narrower beam width in one direction (elevation) and a broader beam width in another direction (azimuth). In addition, to beam width, the resolution needed for an application may require additional side slot pairs to increase resolution. The amount to which the feed slots 78, 79 couple with individual side slots 81-96 varies to tailor the leakage rate from the feed slots 78, 79 as the travelling waves proceed along the antenna array 170. In the current embodiment, the objective is to operate over 20 GHz of bandwidth. Accordingly, the openings between the side slots, for example the side slots 83, 85 as shown in FIG. 6, may be of different sizes. In this example, the travelling wave propagation direction 99 passes the side slot 83 before the side slot 85. The opening 98 between the feed slot 78 and the side slot 83 has a width 101 that is smaller than the width 103 of the opening 97 between the feed slot 78 and the downstream side slot 85. This ensures that the entire antenna array 170 is activated at a desirable level. In addition, the traveling wave antenna array 170 radiates through the silicon substrate of the interposer substrate 112, which leads to improved efficiency. The resulting elevation beam width 132 is approximately 16.5-degrees and the azimuth beam width 122 is approximately 85-degrees for a wider detection area. The antenna can form an array in the azimuth plane to provide higher resolution.

Figure 7:
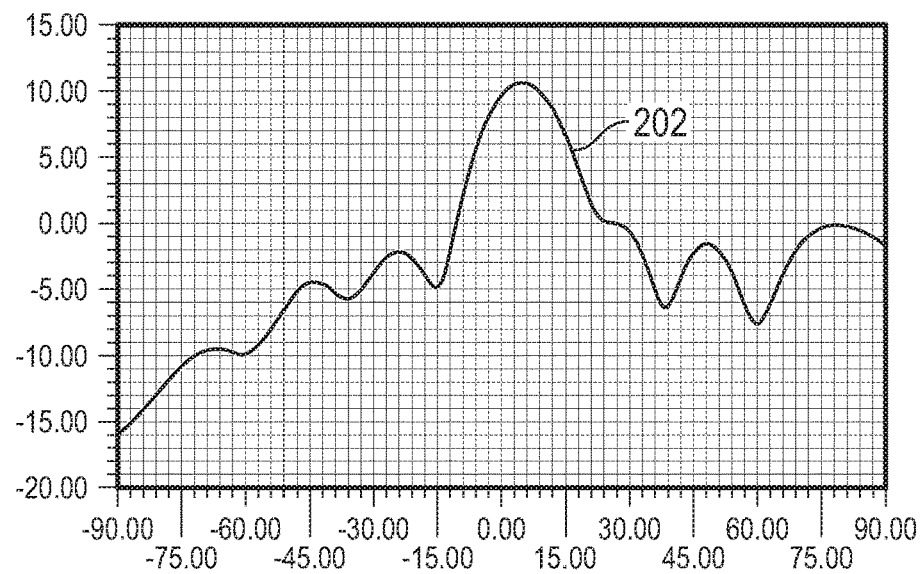
FIG. 7 is a plot of realized gain in dB versus field of vertical view in degrees for the antenna system of FIG. 4, in accordance with an embodiment.

Gain is related to the directionality of the radiation pattern of the antenna system 100. FIG. 7 is a graph that charts an E-plane cut of the far field realized gain pattern of the array in dB versus angle in degrees. The resulting antenna pattern 202 demonstrates a desirable realized gain of approximately 10.5 dB over the 228 GHz-240 GHz band for the elevation field of view, which demonstrates the directional focus of the radiation pattern. Peak sidelobes levels vary from 13.8 dB to 17 dB over the band.

Figure 8:
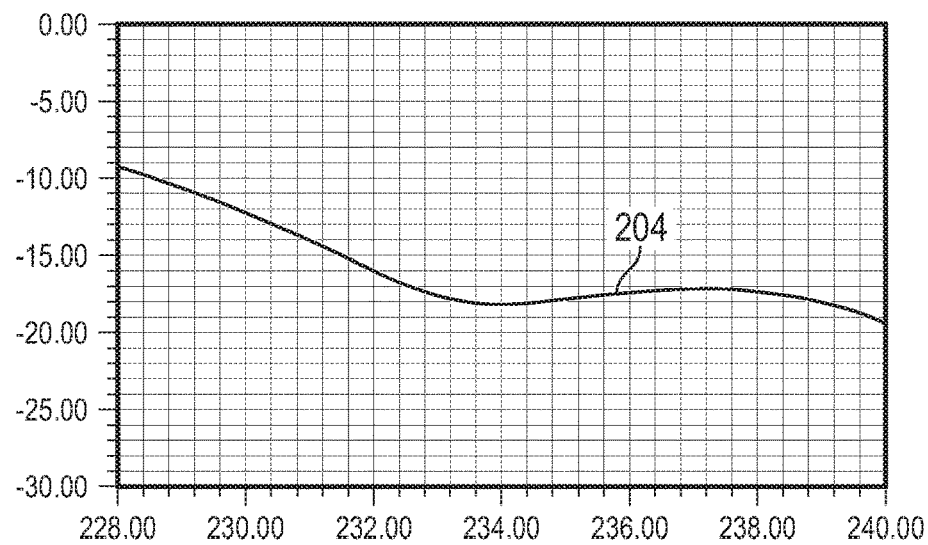
FIG. 8 is a plot of input reflection coefficient in dB over a 12 GHz frequency band for the antenna system of FIG. 4, in accordance with an embodiment.
Figure 9:
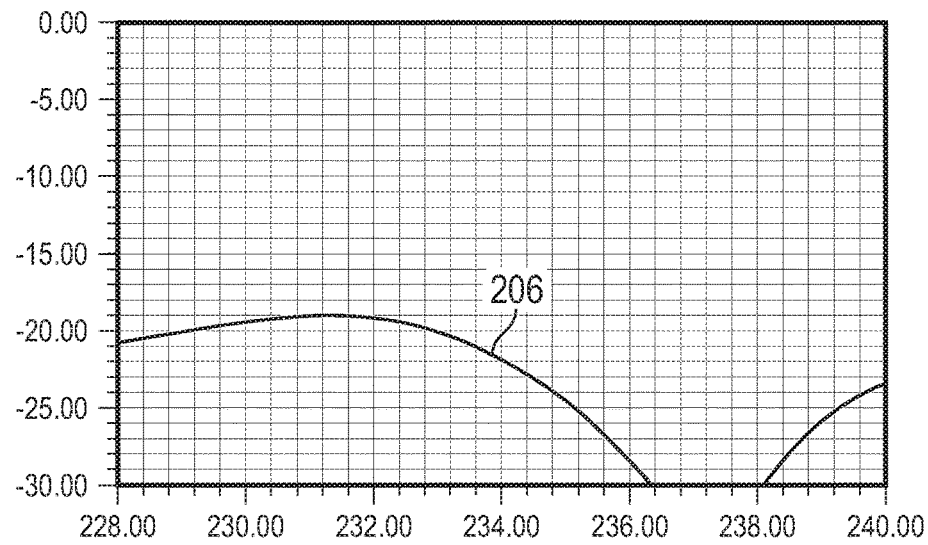
FIG. 9 is a plot of isolation between array elements in dB over a 12 GHz frequency band for the antenna system of FIG. 4, in accordance with an embodiment.

Input reflection coefficient of the antenna array 170 in dB over the 12 GHz (228 GHz-240 GHz) frequency band is illustrated in FIG. 8. The plot 204 shows a good impedance match of <−10 dB over the 12 GHz frequency band. A magnitude over 10 dB indicates good matching with the transmitter. The design maintains favorable gain and match with a ±15 um variation in the copper pillar height and ±2.5 um interposer substrate height. Isolation between array elements over the 12 GHz frequency band with half-lambda spacing shows a minimum coupling of −19 dB at 231 GHz as demonstrated by the plot 206 of FIG. 9, with improved coupling at higher frequencies.

According to the embodiments described herein, antenna configurations operating at a 228 GHz-240 GHz frequency range are provided for applications including radar imaging. The antenna system uses a dielectric interposer with no vias through the interposer and the array radiates through the interposer substrate. This architecture provides desirable performance characteristics and simplifies fabrication and assembly. The antenna radiating structure uses a CPW fed, cavity backed slot, traveling wave array. In other embodiments, multiple arrays may be used, such as by stacking or in other configurations. These other embodiments may be used to cover multiple areas, such as around the perimeter of a vehicle. A cavity for the antenna is formed by copper pillars that attach the interposer to a ground plane located on an RF substrate that may contain additional ICs and electronic components. The wave feed connects directly to transmit and receive input/output RF ICs and a CPW to slot array transition is used to excite the antenna elements that radiate directly through the interposer substrate. The design of the radiating elements results in a relatively narrow beam width in elevation and a relatively broad beam width in azimuth.

The invention provides very good impedance match over 12 GHz of bandwidth and good radiation patterns in a simple low cost architecture. Broad band and low loss characteristics are achieved through the unique architecture. Low cost is achieved by using only one back metal layer and avoiding any vias through the interposer. The design uses a Si (1 KΩ-10 KΩ cm) interposer. The invention may also be implemented using other interposers like glass or organic substrates and with vias through interposer—through-silicon vias (TSV) or through-glass vias (TGV). Using TSV/TGV may improve the performance by reducing the surface wave radiations and coupling but at the expense of added fabrication cost.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. An antenna system, comprising:
a substrate of a dielectric material; and
a conductive layer disposed on the substrate and defining a feed slot joining a number of side slots arranged in a line forming an array, the side slots spaced from one another;
wherein the array is configured to radiate a radiation pattern characterized by a first beam width in a first plane and a second beam width in a second plane perpendicular to the first plane, wherein the first beam width is wider than the second beam width,
wherein the substrate is configured as an interposer,
wherein the array is configured to radiate the radiation pattern through the interposer.

2. The system of claim 1, wherein the conductive layer has first and second sides and comprising:
a first ground plane disposed on the first side of the array and spaced apart from the array; and
a number of conducting pillars grounding the substrate to the first ground plane,
wherein the conducting pillars define a second ground plane on the substrate,
wherein the conducting pillars do not extend through the substrate.

3. The system of claim 2, wherein the substrate is disposed on the second side of the array.

4. The system of claim 2, wherein the first ground plane, the conductive pillars and the second ground plane define an air cavity configured to prevent back radiation in a direction outward from the first side of the substrate.

5. The system of claim 1, comprising a number of conducting pillars grounding the substrate to the first ground plane, wherein the conducting pillars define a second ground plane on the substrate, wherein the conducting pillars do not extend through the substrate.

6. The system of claim 1, comprising a dielectric layer disposed on the conductive layer, wherein the conductive layer disposed on the substrate and defining a feed slot joining a number of side slots arranged in a line forming an array, the side slots spaced from one another, wherein the conductive layer defines an opening between each of the side slots and the feed slot, wherein the respective opening between at least one of the side slots and the feed slot is smaller than the respective opening between another of the side slots and the feed slot.

7. The system of claim 1, comprising a coplanar waveguide configured to launch a signal to the feed slot.

8. The system of claim 7, comprising;
a ground plane spaced apart from the array; and
a front end module configured to generate a signal and to deliver the signal to the coplanar waveguide, wherein the front end module is disposed between the conductive layer and the ground plane.

9. The system of claim 8, comprising a radio frequency printed circuit board, wherein the ground plane is disposed on the radio frequency printed circuit board.

10. The system of claim 9, comprising a transceiver module disposed on the radio frequency printed circuit board and coupled with the array through the front end module and the substrate.

11. An antenna system, comprising:
a substrate of a dielectric material; and
a conductive layer disposed on the substrate and defining a feed slot joining a number of side slots arranged in a line forming an array, the side slots spaced from one another;
wherein the conductive layer defines an opening between each of the side slots and the feed slot,
wherein the respective opening between at least one of the side slots and the feed slot is smaller than the respective opening between another of the side slots and the feed slot,
wherein the array is configured to radiate a radiation pattern characterized by a first beam width in a first plane and a second beam width in a second plane perpendicular to the first plane, wherein the first beam width is wider than the second beam width.

12. The system of claim 11, wherein the conductive layer has first and second sides and comprising:
a first ground plane disposed on the first side of the conductive layer and spaced apart from the conductive layer; and
a number of conducting pillars grounding the substrate to the first ground plane,
wherein the substrate is disposed on the second side of the conductive layer,
wherein the conducting pillars define a second ground plane on the substrate, wherein the conducting pillars do not extend through the substrate.

13. The system of claim 12, comprising:
a coplanar waveguide configured to launch a signal to the feed slot; and
a front end module configured to generate a signal and to deliver the signal to the coplanar waveguide, wherein the front end module is disposed between the conductive layer and the first ground plane.

14. The system of claim 12, wherein the second ground plane comprises a silicon material, is defined on the substrate and is bounded by the conducting pillars, wherein the first ground plane, the conductive pillars and the second ground plane define an air cavity configured to prevent back radiation in a direction outward from the first side of the substrate.

15. The system of claim 11, comprising a second feed slot connected with an additional number of side slots.

16. The system of claim 11, wherein the substrate is configured as an interposer through which the array is fed a signal, wherein the array is configured to radiate the radiation pattern through the interposer, wherein the first beam width extends in an azimuth direction relative to the vehicle and the second beam width extends in an elevation direction relative to the vehicle.

17. The system of claim 11, comprising a dielectric layer disposed on the conductive layer.

18. The system of claim 11, comprising:
a transmitter coupled with the array;
a radio frequency printed circuit board through which the array is coupled with the transmitter; and
a ground plane disposed on the radio frequency printed circuit board;
wherein the ground plane is spaced away from the substrate.

19. The system of claim 11, comprising a number of conductive pillars surrounding the array and contacting the substrate.

20. An antenna system for a radar of a vehicle, the system comprising:
a substrate of a dielectric material;
a conductive layer disposed on the substrate and defining a feed slot joining a number of side slots arranged in a line forming an array through the conductive layer, the side slots spaced from one another and the array disposed on the substrate, the conductive layer having first and second sides;
a coplanar waveguide configured to launch a signal to the feed slot;
a first ground plane disposed on the first side of the conductive layer and spaced apart from the conductive layer;
a number of conducting pillars grounding the substrate to the first ground plane; and
a second ground plane of a silicon material defined on the substrate and bounded by the conductive pillars,
wherein electromagnetic energy is radiated by the array as a result of travelling waves that travel along the feed slot,
wherein the array is configured to radiate a radiation pattern characterized by a first beam width in a first plane and a second beam width in a second plane perpendicular to the first plane, wherein the first beam width is wider than the second beam width,
wherein the first beam width extends in an azimuth direction relative to the vehicle and the second beam width extends in an elevation direction relative to the vehicle.

* * * * *